United States Patent [19]

Griffel

[11] 4,168,634
[45] Sep. 25, 1979

[54] CHAIN AND SPROCKET POWER TRANSMITTING MECHANISM

[75] Inventor: Irving Griffel, Ann Arbor, Mich.

[73] Assignee: General Motors Corporation, Detroit, Mich.

[21] Appl. No.: 801,068

[22] Filed: May 27, 1977

[51] Int. Cl.² .............................................. F16H 55/30
[52] U.S. Cl. .................................. 74/243 R; 74/243 S
[58] Field of Search .................. 74/229, 243 S, 243 R, 74/443, 457, 245 R, 245 S

[56] References Cited

U.S. PATENT DOCUMENTS

| 3,377,875 | 4/1968 | Sand ........................................ 74/229 |
| 3,495,468 | 2/1970 | Griffel ..................................... 74/229 |

FOREIGN PATENT DOCUMENTS 704702  3/1965  Canada ....................................... 74/443

Primary Examiner—Samuel Scott
Assistant Examiner—William R. Henderson
Attorney, Agent, or Firm—Donald F. Scherer

[57] ABSTRACT

A driving and driven sprocket and endless chain arrangement wherein the driven sprocket includes a first set of conventional involute teeth and a second set of modified teeth disposed in respective random patterns, and wherein the modified teeth have the flanks on the trailing sides thereof relieved a predetermined amount and the roots adjacent thereto formed on a diameter a predetermined amount larger than the root diameter of the first set of conventional teeth for improved noise reduction characteristics.

3 Claims, 3 Drawing Figures

CHAIN AND SPROCKET POWER TRANSMITTING MECHANISM

This invention relates generally to chain and sprocket drive arrangements and, more particularly, to an improved sprocket therefor, for applications wherein permissible allowable noise levels are critical.

A typical application wherein noise reduction measures are necessary is in the use of a chain drive for operatively interconnecting a vehicle engine and a transmission positioned in a side-by-side relationship. Various sprocket teeth modifications have been advocated toward this end. For example, Griffel U.S. Pat. No. 3,495,468 and Sand U.S. Pat. No. 3,377,875 disclose satisfactory arrangements.

It is a general object of this invention to provide an additional improved chain and sprocket drive arrangement for minimizing noise levels in a parallel engine and transmission application.

Another object of the invention is to provide an improved sprocket wherein selected teeth therof have the flanks on the trailing side thereof relieved with the adjacent roots having a diameter a predetermined amount larger than the root diameter of the remaining conventional involute teeth of the sprocket.

A further object of the invention is to provide an improved chain and sprocket drive arrangement wherein the driving sprocket includes conventional involute-type teeth, while the driven sprocket includes a predetermined randomly patterned combination of conventional involute teeth and modified teeth having relieved flanks on the drive side thereof and adjacent shallow roots, causing the flanks of the chain teeth to contact only the flanks on the drive side of the conventional sprocket teeth for the driving function, and the tips of the chain teeth to contact only the roots of the modified sprocket teeth for the noise reduction characteristic.

These and other objects and advantages of the invention will be apparent when reference is made to the following description and accompanying drawings, wherein.

Figure 1:
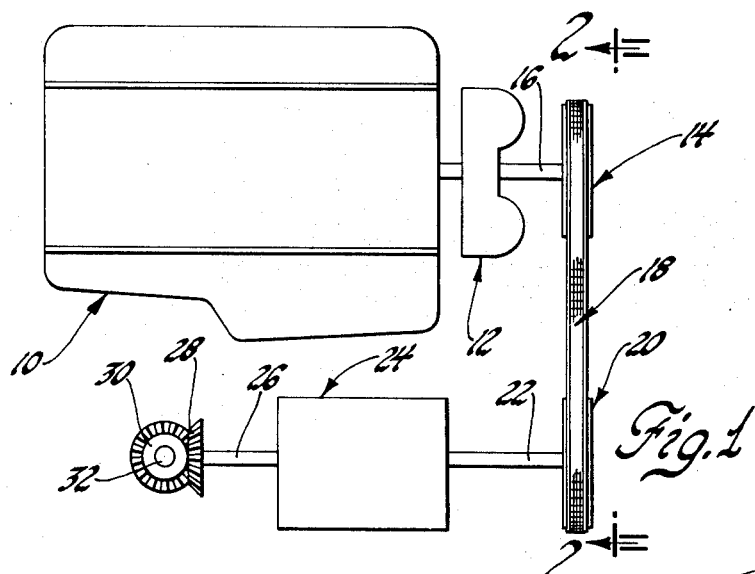
FIG. 1 is a schematic illustration of a vehicle engine and transmission disposed in a parallel relationship, operatively interconnected by a chain and sprocket arrangement embodying the invention.

Referring now to the drawings in greater detail, FIG. 1 illustrates a vehicle engine 10 driving a torque converter 12 which, in turn, drives a sprocket 14 mounted on the converter output shaft 16. An endless inverted tooth-type chain 18, driven by the sprocket 14, transmits torque to a sprocket 20 mounted on the input shaft 22 to drive a transmission 24 for, in turn, driving the vehicle wheels (not shown) via a transmission output shaft 26, gears 28 and 30, and a cross-shaft 32. The sprockets 14 and 20 will hereinafter be referred to as driving and driven sprockets, respectively.

Figure 2:
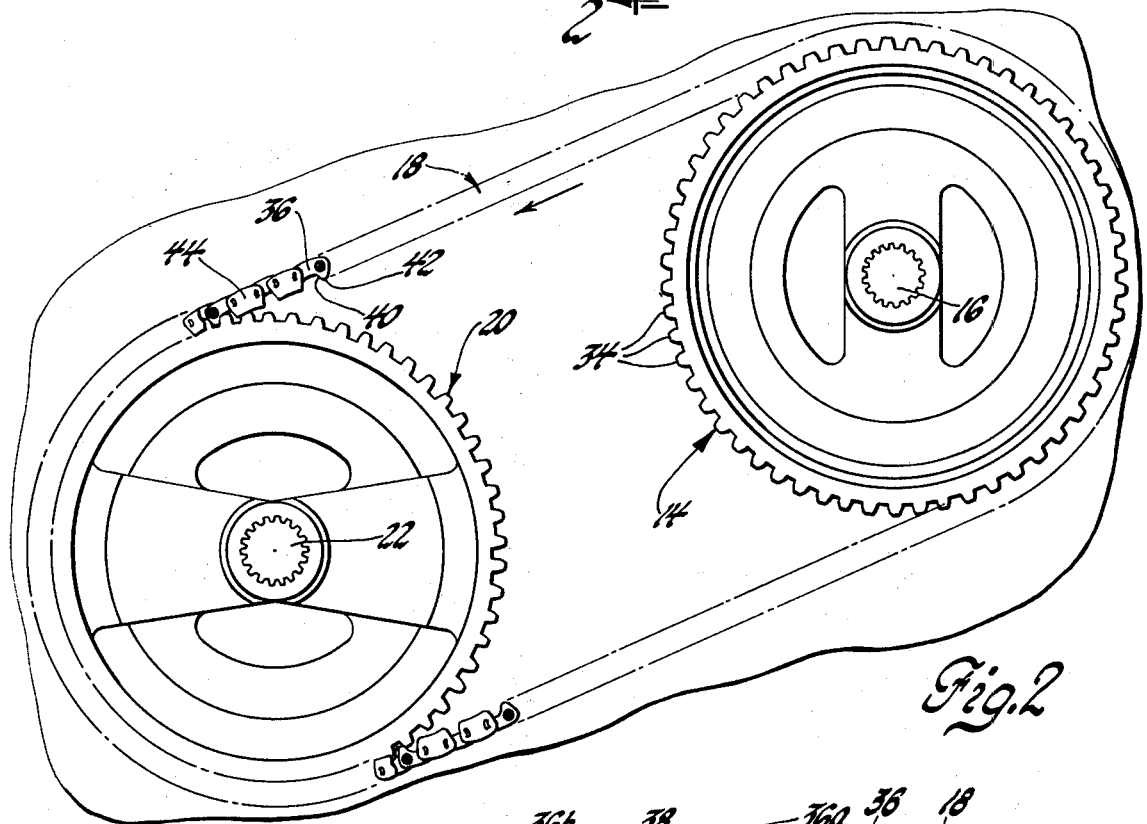
FIG. 2 is an enlarged side elevational view of the chain and sprocket arrangement taken along the plane of the line 2—2, and looking in the direction of the arrows.

Referring now to FIG. 2, the driving and driven sprockets 14 and 20 are shown operatively interconnected by the chain 18, the driving sprocket 14 and the chain 18 being of conventional designs. The driving sprocket 14 includes a full set of substantially identical conventional involute-type teeth 34. The chain 18 comprises a plurality of identical inverted toothed links 36 assembled as alternately positioned and aligned sets 36a and 36b, as may be better noted in FIG. 3, secured by a suitable pivot arrangement, such as a double pivot pin connection 38. Each link 36a includes two teeth, each having a flank 40a and a tip 42a, while each alternate link 36b includes two teeth, each having a flank 40b and a tip 42b. Outside guide links 44 (FIG. 2) mounted on the assembled sets 36a and 36b of links 36 serve to position the chain 18 on the sprockets 14 and 20.

Figure 3:
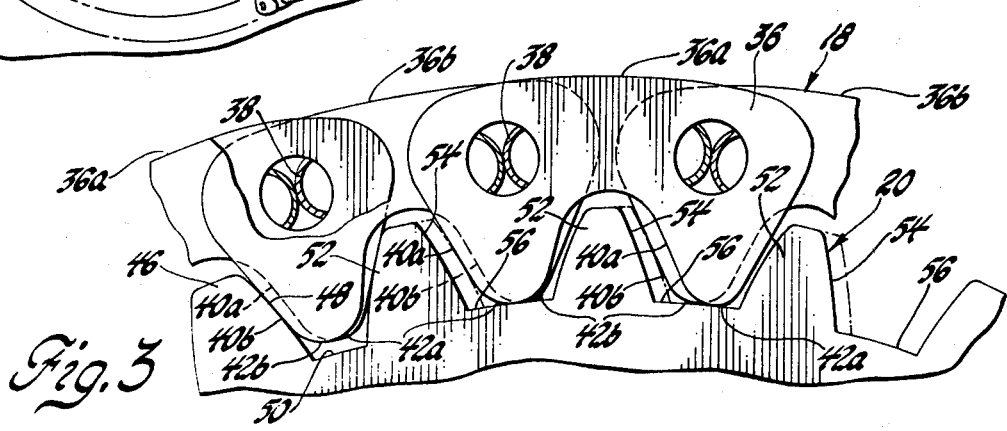
FIG. 3 is an enlarged view of a portion of the FIG. 2 structure showing an operational characteristic thereof.

As shown in FIG. 3, the teeth of the driven sprocket 20 are of two different designs, and disposed in random patterns as will be explained. A first set of teeth include conventional involute teeth 46 each having a driving flank 48 and a root 50 formed on the driven side thereof of a predetermined diameter. A second set of teeth include teeth 52 having the flanks 54 thereof relieved a predetermined amount, with adjacent roots 56 being of a diameter a predetermined amount larger than the root 50 diameter of the first set of teeth 46.

In operation, once each link 36a and 36b begins to pivot about its respective pivot pin connection 38 in the conventional polygon or chordal action manner as the slack side of the chain 18 enters the driven sprocket 20, it is the leading tooth of its two teeth whose flank 40a or 40b contacts the unrelieved flank 48 of each conventional involute teeth 46 to drive the driven sprocket 20. By virtue of the smaller root 50 diameter, the tips 42a and 42b of the chain teeth do not contact the roots 50. With respect to the sprocket teeth 52 and their larger root 56 diameter, the tips 42a and 42b of the sprocket teeth contact the roots 56, without any contact occurring between the chain teeth flanks 40a and 40b and the sprocket teeth flanks 54.

Thus, with the driving force being transmitted by the chain teeth flanks 40a and 40b against the sprocket teeth flanks 48, tests have shown that noise is substantially diminished as a result of the random spaced sprocket teeth 52 whose roots 56 only are contacted by the chain teeth tips 42a and 42b.

While sprockets may vary in the number of teeth they contain, and the modified teeth 52 thereof and their respective relieved drive flanks 54 and shallow roots 56 may be arranged in various predetermined patterns, as one example, a particular arrangement which has been determined to be very satisfactory from a noise reduction standpoint is for the teeth 52 to be located as teeth numbers 1, 2, 3, 4, 5, 8, 11, 16, 19, 20, 21, 24, 25, 26, 27, 30, 33, and 34 of a driven sprocket having a total of 35 teeth.

It should be apparent that, should a particular application warrant it, the modified teeth 52 may be formed on the driving sprocket 14, as well as on the driven sprocket 20, however, experience indicates that maximum excitation or disturbances occurs as the slack side of the chain 18 enters the driven sprocket 20, as compared to that which occurs as the taut side of the chain enters the driving sprocket 14.

What is claimed is:

1. A sprocket drive mechanism including (1) a chain having a plurality of substantially identical pivotally interconnected links having substantially identical teeth adapted to mesh with sprocket teeth, and (2) a sprocket having a first set of substantially equally spaced teeth positioned and shaped to provide flank contact of the flanks of said chain teeth during rolling action of said chain on said sprocket and a predetermined root diameter, and a second set of teeth having a predetermined greater root diameter than said first set and having one relieved flank adjacent each root on the driven side thereof, said first and second sets of teeth being disposed in random order wherein the flanks of said chain teeth contact the oppositely disposed flanks of the first set of teeth at irregularly spaced times and the tips of said chain teeth contact the root only of each of said second set of teeth at irregularly spaced times so as to minimize noise.

2. A drive transmitting mechanism comprising driving and driven sprockets rotatable about axes spaced from each other a fixed sprocket center distance, upstanding sprocket teeth formed on each of said sprockets, a chain for transmitting torque between said sprockets, said chain including a plurality of pivotally interconnected links and having teeth adapted to mesh with said sprocket teeth, the upstanding teeth on said driving sprocket being a full complement of equally spaced teeth of conventional length and size and providing flank contact of the flanks of said chain teeth and adjacent sprocket teeth during rolling action of said chain on said driving sprocket, the upstanding teeth on said driven sprocket including a first plurality of teeth of conventional length and size, and a second plurality of teeth having roots on a diameter a predetermined amount larger than the root diameter of said conventional teeth and each of said second plurality of teeth having one relieved flank adjacent each root on the driven side thereof, said first and second pluralities of teeth being disposed in respective random patterns wherein the flanks of said chain teeth contact the oppositely disposed flanks of adjacent conventional teeth and the tips of said chain teeth contact the root only of each of said second plurality of teeth during rolling action of said chain on said driven sprocket thereby miminizing gear noise.

3. In a drive transmitting mechanism comprising driving and driven sprockets rotatable about axes spaced from each other a fixed sprocket center distance, a chain for transmitting torque between the sprockets, the chain including a plurality of pivotally interconnected links and having teeth adapted to mesh with the sprocket teeth, the teeth on the driving sprocket being a full complement of equally spaced involute teeth of conventional length and size and providing flank contact of the flanks of the chain teeth and adjacent sprocket teeth during chordal action of the chain on the driving sprocket, the improvement comprising teeth on the driven sprocket including a first plurality of teeth of conventional length and size, and a second plurality of teeth having roots on a diameter a predetermined amount larger than the root diameter of the conventional teeth and each of the second plurality of teeth having one relieved flank adjacent each root on the driven side thereof, the first and second pluralities of teeth being disposed in respective random patterns wherein the flanks of the chain teeth contact at least the oppositely disposed flanks on the drive side of adjacent conventional teeth and the tips of the chain teeth contact the root only of each of the second plurality of teeth during chordal action of the chain on the driven sprocket, thereby minimizing gear noise.

* * * * *